June 18, 1968  T. W. COLE  3,388,745
DRILL STEM TESTING APPARATUS
Filed Aug. 25, 1967  2 Sheets-Sheet 1
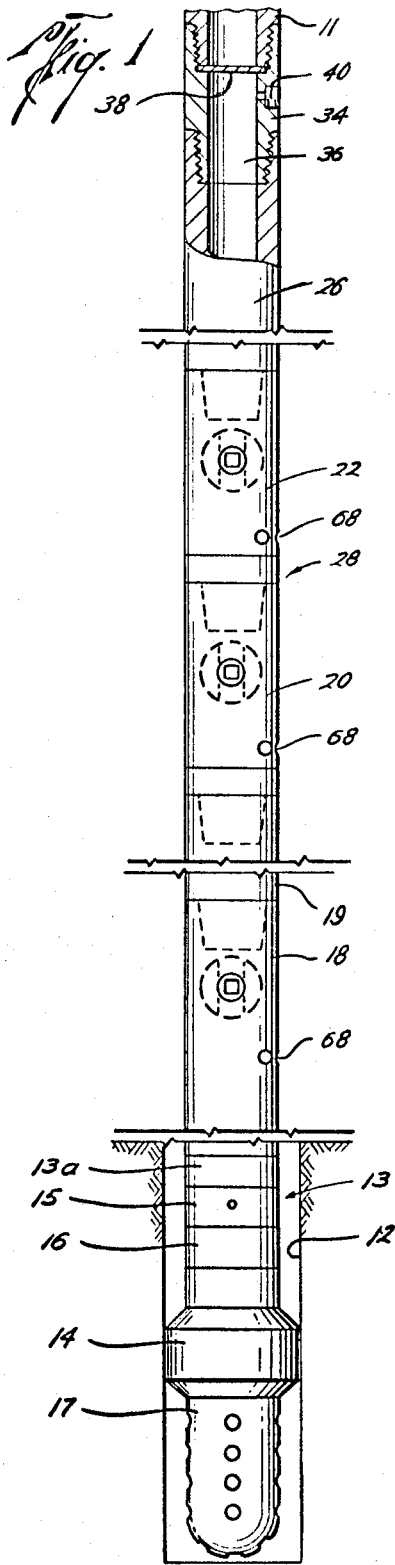
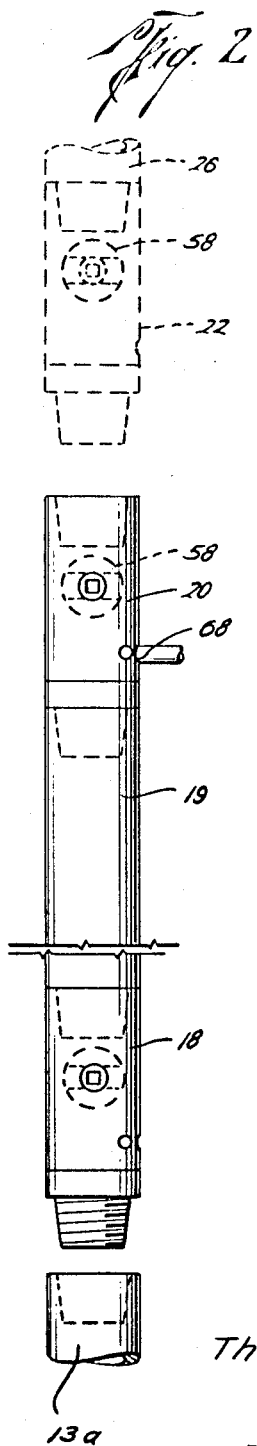
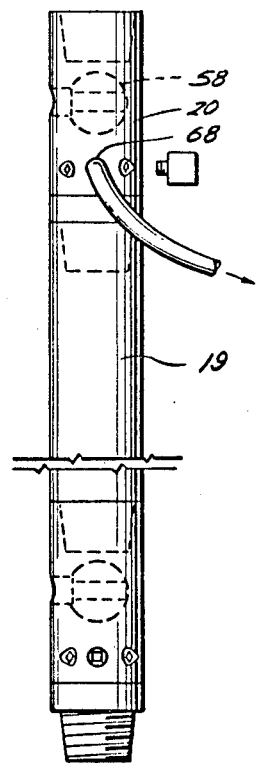
Thomas W. Cole
INVENTOR.
BY David L. Moseley
ATTORNEY June 18, 1968
T. W. COLE
3,388,745
DRILL STEM TESTING APPARATUS
Filed Aug. 25, 1967
2 Sheets-Sheet 2
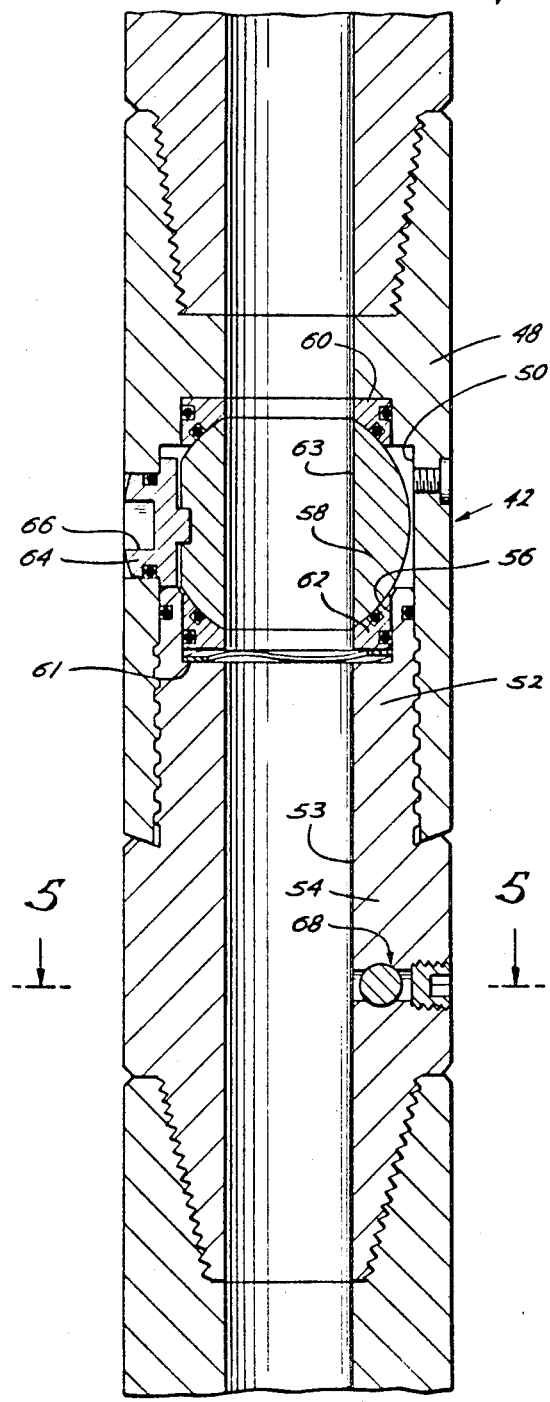
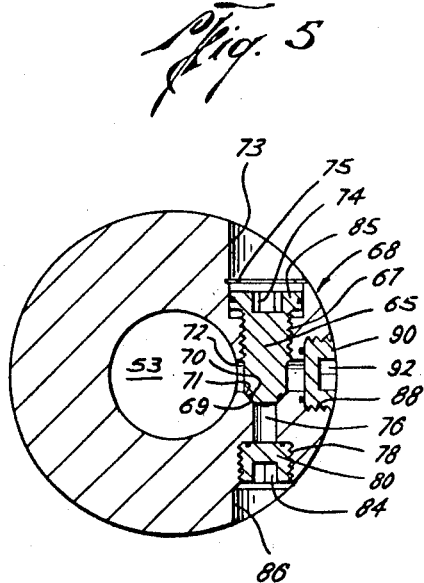
Thomas W. Cole
INVENTOR.
BY David L. Moseley
ATTORNEY

United States Patent Office 3,388,745
Patented June 18, 1968

3,388,745
DRILL STEM TESTING APPARATUS
Thomas W. Cole, Bakersfield, Calif., assignor, by mesne assignments, to Schlumberger Technology Corporation, Houston, Tex., a corporation of Texas
Original application June 21, 1965, Ser. No. 465,490. Divided and this application Aug. 25, 1967, Ser. No. 677,815
3 Claims. (Cl. 166—152)

ABSTRACT OF THE DISCLOSURE

The particular apparatus described herein as illustrative of one form of the invention concerns the retrieval of a closed chamber formation tester which may become stuck in a well bore. Full opening valves separate sections of the chamber. A frangible disc closes the upper end of the chamber and is adaptable to be broken in case the tool becomes stuck in order to provide, along with the valves, a full opening through the apparatus to permit stuck-point locating and joint-releasing devices to be lowered into the apparatus.

---

This is a division of application Ser. No. 465,490, filed June 21, 1965, now abandoned.

This invention relates to formation testing and, more particularly, to apparatus for obtaining recovery of fluid samples from a well bore.

During the drilling of a well, the operator may at some time desire to test a section of the well for production potential. To do this, a testing tool having a normally closed tester valve and a packer means is inserted into the well at the lower end of a string of pipe or tubing. The packer means is disposed at a location just above the section to be tested and expanded to close off the bore of the well. Thus, the section to be tested is isolated from the drilling control fluid which is usually mud. The testing tool includes a pressure recorder which measures the initial pressure of the isolated section to obtain what is referred to as an initial shut-in pressure. The tester valve is then opened and formation fluids flow into the string of tubing. The flow may appear at the surface if the pressures are great enough. Pressure is recorded during the flow period. The tester valve is then closed and a final shut-in pressure recorded.

In this type of testing, flow of formation fluids to the surface may be undesirable under certain circumstances for reasons of safety, secrecy or the prevention of damage or contamination to surrounding property. Such property damage may occur when wells are drilled on city property or in residential areas. Precautions against contamination from oil well fluids may be necessary when wells are drilled on lakes or coastal waters.

Also, it has often been undesirable heretofore to test wells at night since it is necessary to keep electrical equipment running in order to provide light. The presence of such electrical power at the well head may present a hazard if flammable formation fluids and gases are exposed at the surface during testing operations.

During any open hole testing operation there is a possibility that the tool may become stuck in the well bore. Accordingly, a safety joint is normally provided in such tool strings which, when operated, permits removal of the pipe above the safety joint. Sometimes where the stuck point is above the safety joint, it is desirable to unscrew the connection between tubing joints. To determine the stuck point, a free point indicator is used to determine which joint should be unscrewed. To unscrew the joints, an explosive string shot is positioned at the joint to be unthreaded and detonated while unscrewing torque is applied to the string of pipe. In the event that the use of a free point indicator and string shot is warranted, the bore, pipe and tools must be of sufficient size to receive these devices which are lowered into the pipe by means of a cable.

The present invention is directed to control apparatus for use during the testing operation to prevent uncontrolled flow of formation fluids at the surface. The formation fluids are contained in the tool string to prevent their uncontrolled escape at the earth's surface and may be carried from the well site in closed sections of pipe for subsequent analysis. Alternatively, the fluid recovery may be transferred from the sections of pipe to closed containers or covered pits at the well site so that the results of the test are confidential. Additionally, the apparatus is constructed to selectively provide a vertical opening through the string of pipe for the purpose of lowering a free point indicator, string shot, or other device into the string of tools.

Accordingly, it is an object of the present invention to provide new and improved apparatus for conducting drill stem tests where fluids produced during the test are prevented from appearing at the earth's surface.

Another object of the present invention is to provide a new and improved apparatus for conducting drill stem tests wherein the results of the test are confined within a closed chamber.

Yet another object of the present invention is to provide a new and improved apparatus for conducting a drill stem test wherein the test results are confined within a closed chamber which is separable into closed sections of pipe for transportation from the well site and analysis of the test results.

Still another object of the present invention is to provide a new and improved apparatus for conducting a closed chamber drill stem test wherein the upper end of the chamber is selectively operable to permit the use of a free point indicator and string shot to loosen joints in the apparatus.

Therefore, in accordance with the present invention, in a drill stem test, the fluid recovery is limited to a section or sections of drill pipe forming a closed chamber. If the chamber is formed of more than one section of pipe, such sections are separated by normally open valves having a vertical bore therethrough, the valves having external control means. The fluid recovery enters the closed chamber through a test valve in the string of tools. Plug means are provided at the upper end of the chamber to contain the fluids therein. After a sufficient fluid sample has been taken, the test valve is closed. As the sections of pipe forming the chamber are brought to the surface following the test, the normally open valves are closed to form individual, closed chambers which are separated from the string of pipe for removal from the well site for analysis. The formation fluids are thereby maintained in a closed system throughout the test. The plug means for closing off the upper end of the chamber is constructed to be selectively removable when the tool is in the well bore to provide an open bore through the string of tools for reception of apparatus, such as a string shot which is lowered on a cable.

The novel features of the present invention are set forth with particularity in the appended claims. The present invention, both as to its organization and manner of operation together with further objects and advantages thereof, may best be understood by way of illustration and example of certain embodiments when taken in conjunction with the accompanying drawings in which:

FIG. 1 illustrates a string of tools in a well bore which tools form an embodiment of the present invention;

FIGS. 2 and 3 further illustrate the method of operation of the string of tools shown in FIG. 1;

FIG. 4 is a view in cross section of a valve for use in the present invention; and FIG. 5 is a view taken along line 5—5 of FIG. 4.

FIGURE 1 illustrates apparatus embodying the invention where a drill or tubing string 11 is lowered from the surface of the earth into a well bore 12. At the lower end of the drill string 11 is a conventional testing tool string 13 such as the type illustrated and described in U.S. Patent No. 2,901,001. The usual drill stem testing tool string 13 includes a tester tool 13a having a flow tube with a normally closed but selectively operable valve (not shown) and a packer element 14. The packer element 14, when actuated as shown, expands into sealing engagement with the borehole wall. After the tester valve is opened, fluid from below the packer 14 flows through its flow tube and into the tubing string. Pressure recorders (not shown) in the tool string 13 measure and record pressures. A selectively operable bypass valve 15 is positioned in the tool string below the tester to permit well fluid to bypass the packer when the tool string is being lowered into the well bore. A safety joint 16 is positioned in the tool string above the packer to permit removal of the string of pipe above the packer should the packer or perforated anchor 17 become stuck in the well bore. As shown in FIG. 1, the perforated anchor 17 is positioned on the lower end of the string of tools for admitting well fluid to the flow tube and for engaging the bottom of the well bore to expand the packer in a conventional manner. It will be appreciated that hook-wall packers (not shown), which can be set without a bottom hole anchor, could be employed rather than the type described.

In the present invention, a valved sub 18 couples the lower end of a section of drill pipe 19 to the tester tool string 13. Another valved sub 20 is coupled to the upper end of pipe section 19. Similarly, a valved sub 22 is positioned at the lower end of a section of pipe 26 above the section of pipe 19 to provide two valved subs in tandem between each of the sections 19 and 26 of drill pipe. Any number of sections of drill pipe may be coupled together in this fashion to provide a sample chamber 28 of any desired capacity depending upon the amount of formation fluid expected to be recovered during the test. It has been found that about 1,000 feet of pipe provides a sufficient chamber for testing most wells.

The section of drill pipe 26 forming the uppermost end of the sample chamber 28 is coupled at its upper end to the drill string 11 by a closure sub 34. Sub 34 is provided with a vertical bore 36 therethrough of sufficient diameter to permit passage of a free point indicator and string shot. A breakable disc plug 38 is arranged to close the bore 36 and thereby close the upper end of the section of pipe 26 and the entire sample chamber 28. A valve 40 is provided in the sub 34 below the disc 38 to provide fluid communication between the bore 36 and exterior of sub 34. The operation of this valve will hereinafter be described in greater detail with reference to FIG. 3.

FIG. 4 shows the valved subs in detail. Each of these subs is comprised of a valve assembly 42 which includes an upper housing portion 48 and a lower housing portion 54. A vertical bore 53 is formed through the valve assembly 42. The upper housing has an enlarged bore portion 50 which is threaded at its lower end to receive a threaded end 52 of the lower housing. The lower housing also has an enlarged bore portion 56 at its upper end. The upper and lower housing portions are assembled to form a recess between the enlarged bore portions 50, 56 for receiving a ball-shaped valve body 58. The valve body is supported in the recess by upper and lower annular retainer rings 60, 62. O-ring seals in the retainer ring provides a fluid seal between the valve body and the housing.

A spring washer 61 is positioned between the lower housing portion 52 and the lower retainer ring 62 to maintain a snug fit between the valve body and the retainer rings. A bore 63 is formed through the ball-shaped valve body. The bore 63 may be oriented by rotation of the valve body into alignment with the bore 53 in the valve to provide a vertical bore through the valve assembly 42.

A valve control element 64 is provided on the valve body to permit rotation of the valve body between positions closing and opening the bore 53. A slot 66 in the valve control element 64 permits manipulation of the valve body from the exterior of the valve assembly 42 by use of a suitable wrench or the like.

A valve 68 in valve assembly 42 is best shown by referring to FIG. 5. The valve 68, shown in a closed position, has a body portion 65 threadedly received in a bore 67 and has a tapered end portion 69 provided with an O ring 70. When the valve body 65 is rotated in one direction, the tapered end portion 69 seats in a valve seat 71 to block or close off a transverse fluid passageway 72 which extends through the wall of the sub housing. The passageway 72 provides for fluid communication between an exterior port 86 of the valve assembly 42 and the bore 53. Rotation of the valve body 65 is accomplished by means of a wrench or the like applied to a wrench access 74 in the body 65 through a bore 73 opening to the exterior of the housing. Thus, the valve 68 has a control portion exposed to the exterior of the sub. An enlarged portion 85 of the valve body 65 is provided with an O ring to form a fluid tight seal with the bore 73. A snap ring 75 is received in a snap ring groove to maintain the valve body in the bore 73.

A passageway 76 connects with the seat end 71 of the valve bore 67. An enlarged threaded portion 78 is provided at the end of the passageway to receive a threaded access plug 80. An O-ring seal is provided on the plug to seal the end of the passageway. A wrench access 84 is formed on one end of the plug to facilitate its removal from the threaded end portion of the passageway 76. The wrench is inserted into the access through the port or bore 86 opening to the exterior of the sub housing. When the access plug 80 is removed, the threaded portion 78 provides a means for connecting a flow line to the valve sub.

The passageway 72, which opens to the bore 53, is formed in the housing by boring from the outside of the housing. A threaded end portion 88 of the passageway 72 opening to the exterior of the sub housing receives a threaded plug 90 with seal means to close off the passageway to the exterior of the sub.. Wrench access means 92 are formed in the plug to provide for insertion and removal of the plug.

The valve 40 in sub 34 (FIG. 1) is constructed in the same manner as valve 68 which is described above with respect to FIG. 3.

In operation, the test tool string 13 is lowered into the well bore at the end of a string of tubing or pipe 11, the test valve 13a tof the tool string being closed. Above the tool string 13 is pipe section 19 with subs 18 and 20 secured to its lower and upper ends respectively. The valves 68 in each of the subs is positioned to close off passageway 72. Each of the ball valves 58 in the subs is positioned to open the bores 53 and thereby provide a single continuous sample chamber.

At the level in the well bore where the test is desired, the packer is actuated into sealing engagement with the well bore and the test valve 13a of tool string 13 is opened permitting formation fluids from formations isolated below the packer to flow into the perforated anchor and thence into the pipe sections or chamber 28. It is readily seen that any amount of pipe may be included within this section of the pipe defining chamber 28, the amount depending upon the duration of the formation test. It may be desirable to take several shut-in tests on the formation with intermediate flow periods. At the end of the flow period, the test valve of the tool string 13 is closed, thus closing off the lower end of the chamber 28 leaving a sample of fluid trapped in the chamber.

When the test is completed, the packer 14 is disengaged from the well bore and the string of tools is retrieved to the surface. When sub 34 appears at the rotary table at the surface, the section of pipe in string 11 above the sub is unthreaded from the sub 34 leaving the sub coupled to the upper end of section 26. The access plug 80 is removed from passageway 76 on the valve 40 of sub 34 and a gauge (not shown) is connected to the threaded end 78 of the passageway. The valve 40 is moved by rotation of valve body 65 to open the other end of passageway 76 into communication with bore 36 thereby placing the gauge in communication with the closed chamber 28. After measuring the pressure of chamber 28, the valve 40 is closed, the gauge removed, and a flow line is connected to the threaded end 78 of passageway 76. The valve 40 is again opened to permit the pressure in chamber 28 to be bled off into a closed receptacle connected to the opposite end of the flow line.

The valve 40 is again closed and the flow line is removed. The tool string is then raised until the subs 22 and 20 are positioned above the rotary table. The ball valves 58 in each of the subs are rotated to close the bore 53 and thus close off the lower end of pipe section 26 and the upper end of pipe section 19.

The access plug 80 is then removed from valve 68 in sub 22 and one end of a flow line is connected to the threaded end 78 of passageway 76 in the valve, the other end of the flow line being disposed in a receptacle or the like. The valve 68 is then opened to bleed off fluid which is trapped in the bore 53 between the now closed ball valves 58 in the subs 20 and 22. The valve 68 is then closed and the flow line is removed.

The section of pipe 26 and sub 22 are then unthreaded together from the sub 20 leaving sub 22 positioned at the lower end of pipe section 26 as shown in FIG. 2.

Subsequently, sections of pipe with closed off subs at each end thereof are uncoupled from the string of pipe until the sections of pipe forming the sample chamber have been separated from the tool string. After closing the top valved sub in each section of pipe and uncoupling the section and sub thereabove it may be desirable to bleed off pressure from the remaining sections of pipe in the chamber. In this event the process of coupling a flow line to the valve 68 in the sub is repeated as set forth above.

During the above described operations, the formation fluid sample has remained in a closed system to prevent the disclosure of its contents and to prevent the exposure of hydrocarbon fluids on the derrick floor.

After uncoupling the sections of pipe into individual closed chambers, (FIG. 3) the sections may be transported to a laboratory or shop where the fluid sample in each section may be removed under controlled conditions for inspection.

In the event the tool string should become stuck in the well, and cannot be jarred loose, the safety joint 16 is backed off to permit retrieval of the tools positioned above the safety joint. The remaining part of the tool string is then fished or drilled out. A further safety feature is embodied in the tool should it be necessary to lower a free point indicator, string shot, or other apparatus into the pipe to loosen the threaded connection of a pipe collar and thereby free the tubing string above the collar.

In order to open the bore of sub 34 to permit a device to be lowered therethrough, the plug or disc 38 is removed from its position in bore 36. This may be accomplished by inserting a bar into the tubing string at the surface and dropping the bar. The opening left in the sub 34 by removal of the plug is sufficient to pass the free point indicator and string shot through sub 34. The valved subs are also open during the testing operation to permit the passage of such devices into the string of pipe.

It will be appreciated from the description above that drill stem testing by this method will minimize any hazard of fire when testing with electrical power equipment operating on the derrick floor such as is necessary at night. Furthermore, by controlling the exposure of formation fluids at the well site, it is possible to maintain the results of the test confidential or prevent formation fluids from contaminating adjoining property.

It is pointed out that a single valved sub as shown in FIG. 4 could be positioned between each section of drill pipe forming the sample chamber 28. In this event, the recovery in each section is drained out through valve 68 before the section of pipe is uncoupled from the string of pipe.

While a particular embodiment of the present invention has been shown and described, it is apparent that changes and modifications may be made without departing from this invention in its broader aspects and, therefore, the aim in the appended claims is to cover all such changes and modifications as fall within the true spirit and scope of this invention.

What is claimed is:

1. Drill stem testing apparatus for use in a well bore including a sample receiving chamber formed by a string of pipe, a lower valve selectively operable in response to manipulation of the string of pipe in a well bore, a normally opened upper valve having a vertical bore providing a continuous vertical opening through said pipe and external control means for closing said vertical opening, and a breakable member located just above said upper valve and closing off said pipe above said upper valve, said member being breakable in response to means dropped within said string of pipe.

2. Drill stem testing apparatus for use in a well bore including a selectively operable formation test valve adapted for coupling to a string of pipe, a sample receiving chamber formed by a plurality of sections of said pipe, said chamber being in fluid communication with said test valve, selectively operable plug means at the upper end of said chamber, said plug means being operable to provide a full opening through said string of pipe, a pair of subs between each section of pipe forming said chamber and at least one sub at the lower end of said chamber, each of said subs having a vertical bore and a selectively operable valve means for opening and closing said vertical bore, and means controlled from the exterior of said subs for operating said valve means.

3. Drill stem testing apparatus for use in a well bore including a selectively operable formation test valve adapted for coupling to a string of pipe; a fluid sample receiving chamber formed by a plurality of sections of said pipe, said chamber being in fluid communication with said test valve; selectively operable plug means at the upper end of said chamber, said plug means being operable to provide a full opening through said string of pipe; a pair of subs between each section of pipe forming said chamber and at least one sub at the lower end of said chamber, each of said subs having a vertical bore and a selectively operable first valve means for opening and closing said vertical bore; selectively operable second valve means for bleeding fluid pressure from said sections of pipe forming said chamber; and means controlled from the exterior of said pipe for operating said first and second valve means.

References Cited

UNITED STATES PATENTS

| | | | |
|---|---|---|---|
| 1,674,055 | 6/1928 | Nixon et al. | 166—224 |
| 2,364,464 | 12/1944 | Moore | 166—142 |
| 3,038,539 | 6/1962 | Bloom et al. | 166—3 |
| 3,075,585 | 1/1963 | Carlton et al. | 166—164 |
| 3,254,710 | 6/1966 | Jensen | 166—224 X |

DAVID H. BROWN, *Primary Examiner.*